(12) United States Patent
Dabak

(10) Patent No.: US 6,862,275 B1
(45) Date of Patent: Mar. 1, 2005

(54) CELL SELECTION WITH STTD AND SSDT

(75) Inventor: Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/514,451

(22) Filed: Feb. 25, 2000

Related U.S. Application Data

(60) Provisional application No. 60/121,789, filed on Feb. 26, 1999.

(51) Int. Cl.$^7$ ................................................ H04B 7/06
(52) U.S. Cl. ......................... 370/342; 375/267; 375/347
(58) Field of Search ................................. 370/310, 328, 370/331, 333, 334, 342, 442; 375/260, 267, 299, 346, 347; 455/101

(56) References Cited

U.S. PATENT DOCUMENTS

| | | | | |
|---|---|---|---|---|
| 5,737,327 A | * | 4/1998 | Ling et al. | 370/335 |
| 5,812,935 A | * | 9/1998 | Kay | 370/333 |
| 6,127,971 A | * | 10/2000 | Calderbank et al. | 342/368 |
| 6,131,016 A | * | 10/2000 | Greenstein et al. | 455/69 |
| 6,185,258 B1 | * | 2/2001 | Alamouti et al. | 375/260 |
| 6,317,411 B1 | * | 11/2001 | Whinnett et al. | 370/204 |
| 6,415,149 B1 | * | 7/2002 | Bevan et al. | 455/442 |
| 6,526,291 B1 | * | 2/2003 | Ekström et al. | 455/562.1 |
| 2001/0014612 A1 | * | 8/2001 | Uesugi | 455/522 |

FOREIGN PATENT DOCUMENTS

EP     0 566 551 A2    10/1993

OTHER PUBLICATIONS

Yang et al. "A Strength and SIR Combined Adaptive Power Control for CDMA Mobile Radio Channels". IEEE. Sep. 22–25, 1996. pp. 1167–1171.*

Ulukus et al. "Handover Delay in Cellular Wireless Systems". IEEE. Jun. 7–11, 1998. pp. 1370–1374.*

Shinoda et al. "Wideband CDMA Simulator". IEEE. Aug. 9, 1998–Aug. 13, 1998. pp. 318–322.*

Hottinen et al. "Transmit Diversity by Antenna Selection in CDMA Downlink". IEEE. Sep. 2, 1998–Sep. 4, 1998. pp. 767–770.*

Tarokh et al. "Space–time Codes for High Data Rate Wireless Communication: Perfromance Criterion and Code Construction". IEEE. Mar. 1998. pp. 744–765.*

Correia et al. "Space–Time Transmitter Diversity Schemes for Wideband CDMA". IEEE. 2000. May 15, 2000–May 18, 2000. pp. 313–317.*

"A Simple Transmit Diversity Technique for Wireless Communications", IEEE Journal on Selected Areas in Communications, vol. 16, No. 8, Oct. 1998, XP–002100058, ISSN: 0733–8716, pp. 1451–1458.

"Macrodiversity Reception Performance Investigation in Microcellular Networks", Rivas, I., et al., 1997 IEEE 47$^{th}$ Vehicular Technology Conference, Phoenix, May 4–7, 1997, IEEE Vehicular Technology Conference, New York, IEEE, US, vol. 3, Conf. 47, May 4, 1997, pp. 1503–1507, XP000738613, ISBN: 0–7803–3660–7.

(List continued on next page.)

*Primary Examiner*—Chi Pham
*Assistant Examiner*—Derrick W Ferris
(74) *Attorney, Agent, or Firm*—Frederick J. Telecky, Jr.; W. James Brady, III

(57) ABSTRACT

A method of operating a communication circuit comprises the steps of receiving a plurality of signals (508–509, 514–516) from a plurality of remote transmitters (502–506) and determining which of the plurality of remote transmitters use transmit diversity. A signal strength of each respective signal of the plurality of signals is calculated. One of the remote transmitters is selected in response to the steps of determining and calculating.

70 Claims, 4 Drawing Sheets

OTHER PUBLICATIONS

"Simulation of Uplink and Downlink Macrodiversity Schemes in a Cellular Network", Mokhtar Chaar, et al., Africon 1996, 1996 IEEE Africon $4^{th}$ Conference in Africa, Stellebosch, SA, Sep. 25–27, 1996, IEEE Africon Conference in Africa, New York, NY: IEEE, US, vol. 1, Sep. 25, 1996, pp 134–138, XP00849820, ISBN: 0-7803-3020-X.

"Site Diversity Performance in Multipath Fading Environment", Hiroyuki Nakamura, et al., IEEE Global Telecommuciations Conference, Phoenix, Arizona, Nov. 3–8, 1997, Global Telecommunications Conference (Globecom) New York, IEEE, US, vol. 3, Nov. 3, 1997, pp. 1173–1177, XP000737715, ISBN: 0-7803-4199-6.

"A Simple Transmit Diversity Technique for Wireless Communications", Siavash M. Alamouti, IEEE Journal on Select Areas in Communications, vol. 16, No. 8, 10/98, pp. 1451–1458.

"New Detection Schemes for Transmit Diversity with no Channel Estimation", Vahid Tarokh, et al., IEEE, 1998, pp. 917–920.

* cited by examiner

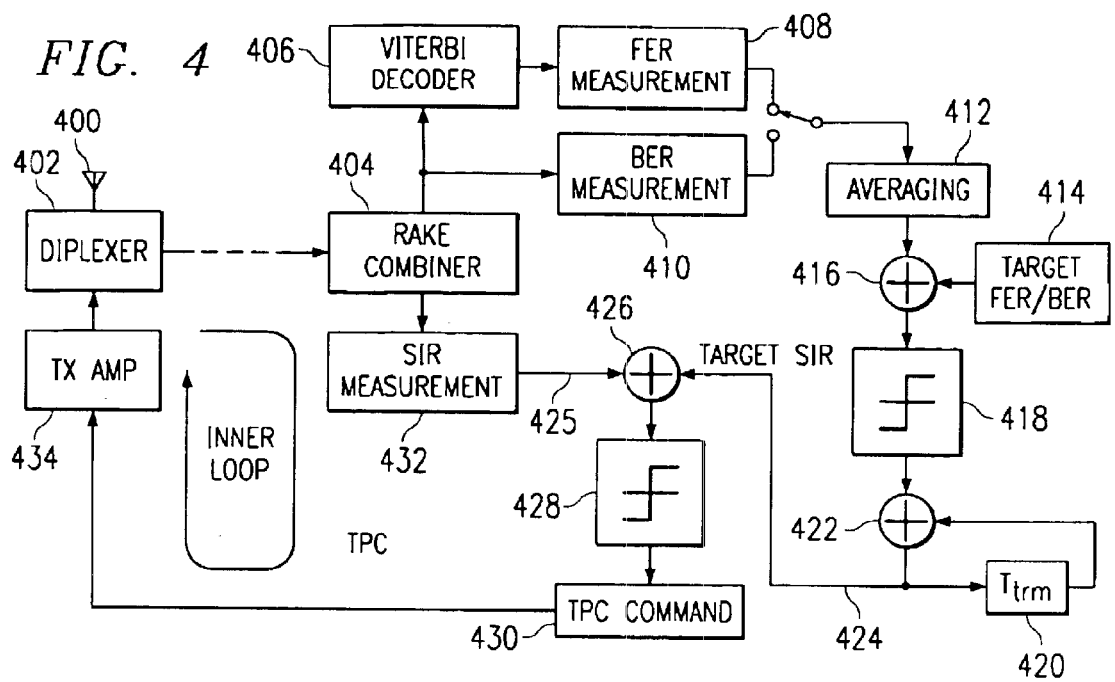
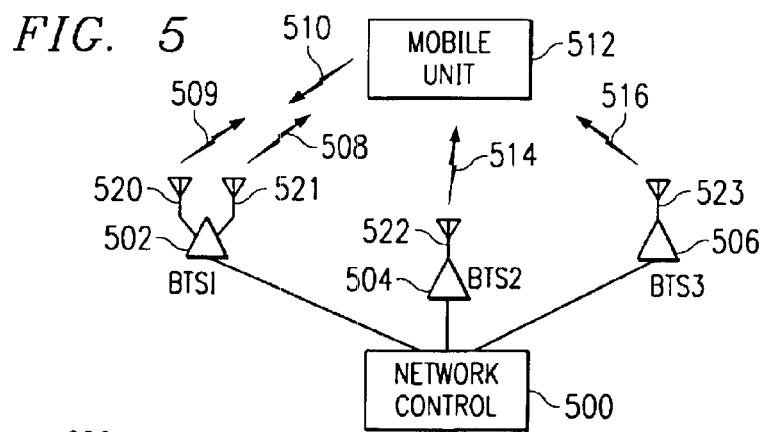
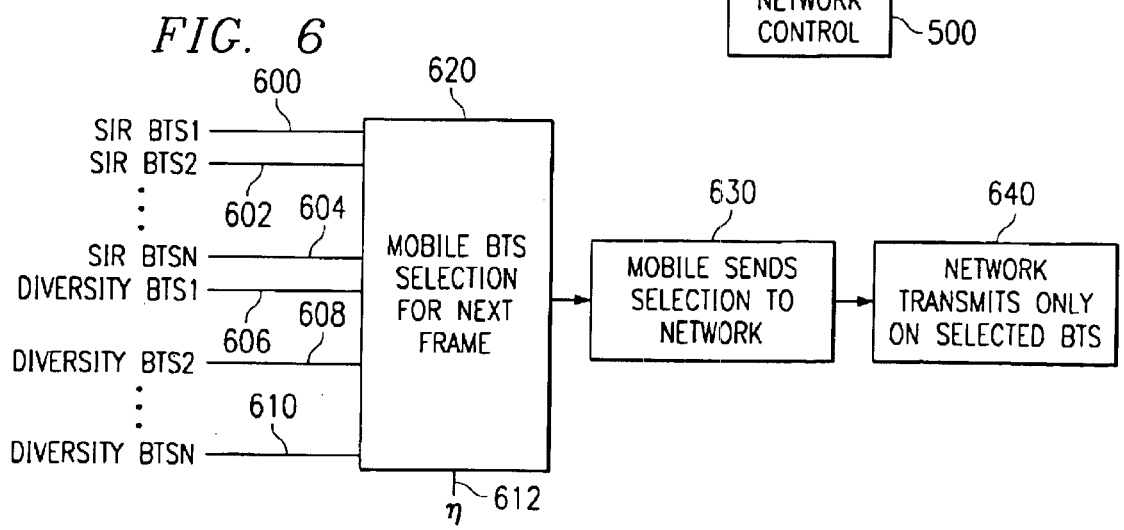

| SIMULATION ENVIRONMENT | INDOOR-TO-OUTDOOR PEDESTRIAN |
|---|---|
| VELOCITY | 3 kmph |
| DATA RATE | 32 KSPS |
| INFORMATION BIT RATE | 8 Kb/s |
| INFO/CRC/TAIL BIT PER FRAME | 80/16/8 |
| CONVOLUTIONAL CODING RATE | 1/3, k = 9 |
| REPETITION | 8 bits/10 ms (312 -> 320) |
| INTERLEAVER | 10 ms, 16*20 |
| DCCH BITS/FRAME | 96 |
| PILOT/TPC/TFI BITS PER SLOT | 8/2/0 |
| CHANNEL ESTIMATION | PERFECT |
| NUMBER OF BASE STATIONS IN SOFT HANDOFF | 3 |
| SIMULATION CONDITION: ONLY SSDT | NO ANTENNA DIVERSITY AT ANY OF THE THREE BASE STATIONS |
| SIMULATION CONDITION: STTD + SSDT | TWO TRANSMIT ANTENNAS WITH STTD ENCODING AT EACH OF THE THREE BASE STATIONS |
| RELATIVE AVERAGE POWERS OF SOFT HANDOFF BASE STATIONS AT THE MOBILE | EQUAL |
| BASE STATION SELECTION AT MOBILE | ONLY SSDT: BASED UPON MAXIMUM RECEIVED POWER STTD+SSDT: BASED UPON MAXIMUM RECEIVED POWER |
| FREQUENCY OF BASE STATION SELECTION FOR SSDT | ONCE PER FRAME (10 msec.) |
| UP LINK ERRORS IN BASE STATION SELECTION FOR SSDT (FBI BIT ERROR RATE) | NONE |
| FORWARD LINK POWER CONTROL | ONLY SSDT: ONE SLOT AVERAGING FOR THE SELECTED BASE STATION STTD+SSDT: ONE SLOT AVERAGING FOR THE SELECTED BASE STATION |
| POWER CONTROL STEP (dB) | 1 |
| POWER CONTROL RATE (Hz) | 1600 |
| TPC UPDATE DELAY (SLOTS) | 1 |
| TPC ERROR RATE | 5% |
| DESIRED CODED BER | $10^{-3}$ |

FIG. 8

CELL SELECTION WITH STTD AND SSDT

CLAIM TO PRIORITY OF PROVISIONAL APPLICATION

This application claims priority under 35 U.S.C. § 119(e)(1) of provisional application Ser. No. 60/121,789, filed Feb. 26, 1999.

FIELD OF THE INVENTION

This invention relates to wideband code division multiple access (WCDMA) for a communication system and more particularly to site selection diversity (SSDT) power control with space-time transmit diversity for WCDMA signals.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. patent application Ser. No. 60/082,671, filed Apr. 22, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames are subdivided into fifteen equal time slots of 0.67 milliseconds each. Each time slot is further subdivided into equal symbol times. At a data rate of 30 KSPS, for example, each time slot includes twenty symbol times. Each frame includes pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N).

Previous studies have shown that multiple transmit antennas may improve reception by increasing transmit diversity for narrow band communication systems. In their paper *New Detection Schemes for Transmit Diversity with no Channel Estimation*, Tarokh et al. describe such a transmit diversity scheme for a TDMA system. The same concept is described in *A Simple Transmitter Diversity Technique for Wireless Communications* by Alamouti. Tarokh et al. and Alamouti, however, fail to teach such a transmit diversity scheme for a WCDMA communication system.

Another improvement in communication systems includes site selection diversity transmit power control (SSDT). The SSDT will be explained with reference to the flow diagram of FIG. 7. A mobile receiver frequently receives signals from multiple base stations. The mobile receiver calculates a signal-to-interference (SIR) ratio for each respective base station. These SIR values are applied to a selection circuit 720 in the mobile receiver. The selection circuit determines the base station with the greatest SIR and sends the identity of this base station to the control network 630 on a frame-by-frame basis. The control network then transmits the next data frame only on the selected base station. This reduces slow lognormal fading and interference within the communication system. SSDT further reduces interference at the mobile receiver and within the cell.

A problem arises with this simplified selection scheme when one or more of the base stations employ transmit diversity. This is because a good SIR may not correspond to a reduced bit error rate within the cell. An improved SIR due to STTD or other transmit diversity methods, therefore, may have a superior bit error rate compared to another base station having no diversity. Previous designs fail to offer or suggest a solution to SSDT base station selection when one or more base stations employ transmit diversity.

SUMMARY OF THE INVENTION

The foregoing problems are resolved by a method of operating a communication circuit comprising the steps of receiving a plurality of signals from a plurality of remote transmitters and determining which of the plurality of remote transmitters use transmit diversity. A signal strength of each respective signal of the plurality of signals is calculated. One of the remote transmitters is selected in response to the steps of determining and calculating.

The present invention reduces interference at the mobile receiver. Transmit power within the cell is reduced.

BRIEF DESCRIPTION OF THE DRAWINGS

A more complete understanding of the invention may be gained by reading the subsequent detailed description with reference to the drawings wherein:

FIG. 4 is a block diagram of a receiver that with the phase correction circuit of FIG. 3;

FIG. 5 is a block diagram showing signal flow in a communication network;

FIG. 6 is a flow diagram showing base station selection of the present invention;

FIG. 8 is a diagram showing simulation parameters for the simulation results of FIG. 9.

DETAILED DESCRIPTION OF THE PREFERRED EMBODIMENTS

Figure 1:
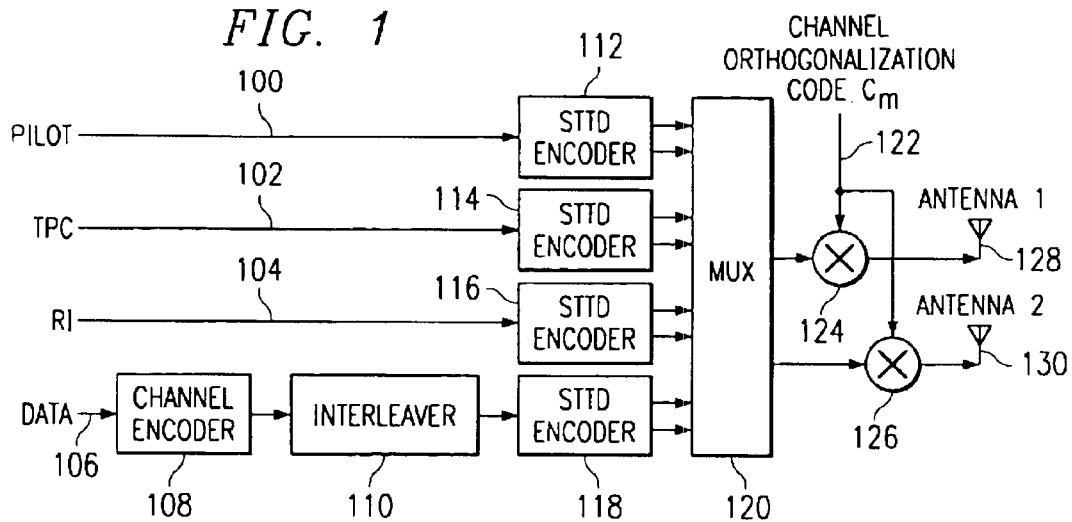
FIG. 1 is a simplified block diagram of a typical transmitter using Space Time Transit Diversity (STTD) of the present invention.

Referring to FIG. 1, there is a simplified block diagram of a typical transmitter using Space Time Transit Diversity (STTD) of the present invention. The transmitter circuit receives pilot symbols, TPC symbols, RI symbols and data symbols on leads 100, 102, 104 and 106, respectively. Each of the symbols is encoded by a respective STTD encoder as will be explained in detail. Each STTD encoder produces two output signals that are applied to multiplex circuit 120. The multiplex circuit 120 produces each encoded symbol in a respective symbol time of a frame. Thus, a serial sequence of symbols in each frame is simultaneously applied to each respective multiplier circuit 124 and 126. A channel orthogonal code $C_m$ is multiplied by each symbol to provide a unique signal for a designated receiver. The STTD encoded frames are then applied to antennas 128 and 130 for transmission.

Figure 2:
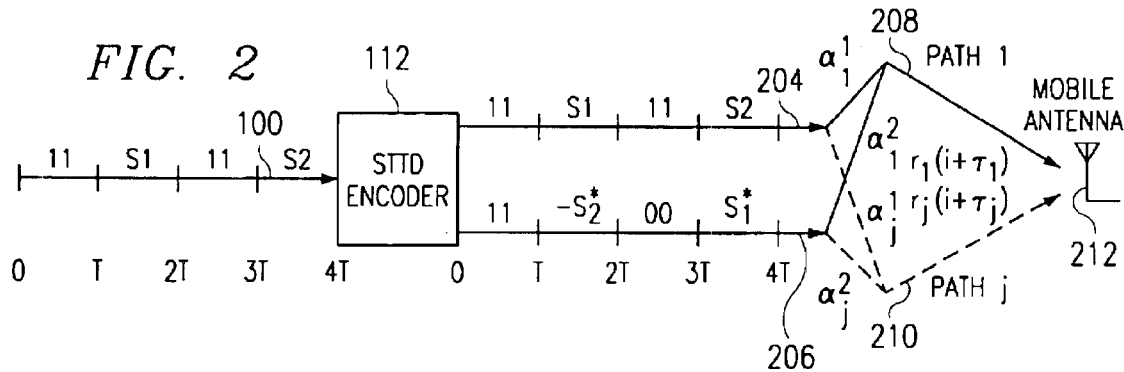
FIG. 2 is a block diagram showing signal flow in an STTD encoder of the present invention that may be used with the transmitter of FIG. 1.

Turning now to FIG. 2, there is a block diagram showing signal flow in an STTD encoder of the present invention that may be used with the transmitter of FIG. 1 for pilot symbol encoding. The pilot symbols are predetermined control signals that may be used for channel estimation and other functions as will be described in detail. Operation of the STTD encoder 112 will be explained with reference to TABLE I. The STTD encoder receives pilot symbol 11 at symbol time T, pilot symbol $S_1$ at symbol time 2T, pilot symbol 11 at symbol time 3T and pilot symbol $S_2$ at symbol time 4T on lead 100 for each of sixteen time slots of a frame. For a first embodiment of the present invention having a data rate of preferably 32 KSPS, the STTD encoder produces a sequence of four pilot symbols for each of two antennas corresponding to leads 204 and 206, respectively, for each of the sixteen time slots of TABLE I. The STTD encoder produces pilot symbols $B_1$, $S_1$, $B_2$ and $S_2$ at symbol times T–4T, respectively, for a first antenna at lead 204. The STTD encoder simultaneously produces pilot symbols $B_1$, $-S_2^*$, $-B_2$ and $S_1^*$ at symbol times T–4T, respectively, at lead 206 for a second antenna. Each symbol includes two bits representing a real and imaginary component. An asterisk indicates a complex conjugate operation or sign change of the imaginary part of the symbol. Pilot symbol values for the first time slot for the first antenna at lead 204, therefore, are 11, 11, 11 and 11. Corresponding pilot symbols for the second antenna at lead 206 are 11, 01, 00 and 10.

The bit signals $r_j(i+\tau_j)$ of these symbols are transmitted serially along respective paths 208 and 210. Each bit signal of a respective symbol is subsequently received at a remote mobile antenna 212 after a transmit time $\tau$ corresponding to the $j^{th}$ path. The signals propagate to a despreader input circuit (not shown) where they are summed over each respective symbol time to produce input signals $R_j^1$, $R_j^2$, $R_j^3$ and $R_j^4$ corresponding to the four pilot symbol time slots and the $j^{th}$ of L multiple signal paths as previously described.

TABLE I

| SLOT | ANTENNA 1 | | | | ANTENNA 2 | | | |
|---|---|---|---|---|---|---|---|---|
| | $B_1$ | $S_1$ | $B_2$ | $S_2$ | $B_1$ | $-S_2^*$ | $-B_2$ | $S_1^*$ |
| 1 | 11 | 11 | 11 | 11 | 11 | 01 | 00 | 10 |
| 2 | 11 | 11 | 11 | 01 | 11 | 11 | 00 | 10 |
| 3 | 11 | 01 | 11 | 01 | 11 | 11 | 00 | 00 |
| 4 | 11 | 10 | 11 | 01 | 11 | 11 | 00 | 11 |
| 5 | 11 | 10 | 11 | 11 | 11 | 01 | 00 | 11 |
| 6 | 11 | 10 | 11 | 11 | 11 | 01 | 00 | 11 |
| 7 | 11 | 01 | 11 | 00 | 11 | 10 | 00 | 00 |
| 8 | 11 | 10 | 11 | 01 | 11 | 11 | 00 | 11 |
| 9 | 11 | 11 | 11 | 00 | 11 | 10 | 00 | 10 |
| 10 | 11 | 01 | 11 | 01 | 11 | 11 | 00 | 00 |
| 11 | 11 | 11 | 11 | 10 | 11 | 00 | 00 | 10 |
| 12 | 11 | 01 | 11 | 01 | 11 | 11 | 00 | 00 |

TABLE I-continued

| SLOT | ANTENNA 1 | | | | ANTENNA 2 | | | |
|---|---|---|---|---|---|---|---|---|
| | $B_1$ | $S_1$ | $B_2$ | $S_2$ | $B_1$ | $-S_2^*$ | $-B_2$ | $S_1^*$ |
| 13 | 11 | 00 | 11 | 01 | 11 | 11 | 00 | 01 |
| 14 | 11 | 10 | 11 | 00 | 11 | 10 | 00 | 11 |
| 15 | 11 | 01 | 11 | 00 | 11 | 10 | 00 | 00 |
| 16 | 11 | 00 | 11 | 00 | 11 | 10 | 00 | 01 |

The input signals corresponding to the pilot symbols for each time slot are given in equations [5–8]. Noise terms are omitted for simplicity. Received signal $R_j^1$ is produced by pilot symbols ($B_1$, $B_1$) having a constant value (11,11) at symbol time T for all time slots. Thus, the received signal is equal to the sum of respective Rayleigh fading parameters corresponding to the first and second antennas. Likewise, received signal $R_j^3$ is produced by pilot symbols ($B_2$,$-B_2$) having a constant value (11,00) at symbol time 3T for all time slots. Channel estimates for the Rayleigh fading parameters corresponding to the first and second antennas, therefore, are readily obtained from input signals $R_j^1$ and $R_j^3$ as in equations [9] and [10].

$$R_j^1 = a_j^1 + a_j^2 \quad [5]$$

$$R_j^2 = a_j^1 S_1 - a_j^2 S_2^* \quad [6]$$

$$R_j^3 = a_j^1 - a_j^2 \quad [7]$$

$$R_j^4 = a_j^1 S_1 + a_j^2 S_1^* \quad [8]$$

$$a_j^1 = (R_j^1 + R_j^3)/2 \quad [9]$$

$$a_j^2 = (R_j^1 - R_j^3)/2 \quad [10]$$

Figure 3:
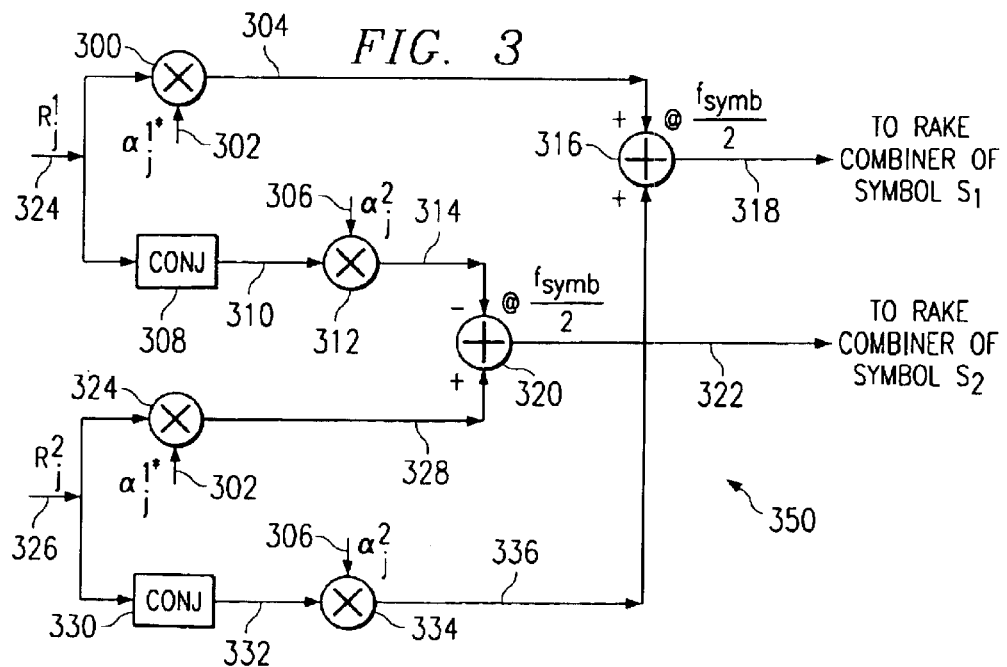
FIG. 3 is a schematic diagram of a phase correction circuit of the present invention that may be used with a receiver.
Figure 7:
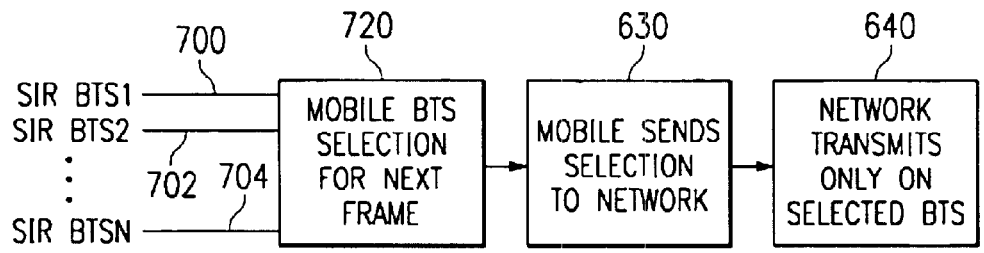
FIG. 7 is a flow diagram showing base station selection of the prior art.

Referring now to FIG. 3, there is a schematic diagram of a phase correction circuit of the present invention that may be used with a remote mobile receiver. This phase correction circuit receives input signals $R_j^2$ and $R_j^4$ on leads 324 and 326 at symbol times 2T and 4T, respectively. Each input signal has a value determined by the transmitted pilot symbols as shown in equations [6] and [8], respectively. The phase correction circuit receives a complex conjugate of a channel estimate of a Rayleigh fading parameter $a_j^{1*}$ corresponding to the first antenna on lead 302 and a channel estimate of another Rayleigh fading parameter $a_j^2$ corresponding to the second antenna on lead 306. Complex conjugates of the input signals are produced by circuits 308 and 330 at leads 310 and 322, respectively. These input signals and their complex conjugates are multiplied by Rayleigh fading parameter estimate signals and summed as indicated to produce path-specific first and second symbol estimates at respective output leads 318 and 322 as in equations [11] and [12].

$$R_j^2 a_j^{1*} + R_j^{4*} a_j^2 = (|a_j^1|^2 + |a_j^2|^2) S_1 \quad [11]$$

$$-R_j^{2*} a_j^2 + R_j^4 a_j^{1*} = (|a_j^1|^2 + |a_j^2|^2) S_2 \quad [12]$$

These path-specific symbol estimates are then applied to a rake combiner circuit 404 (FIG. 4) to sum individual path-specific symbol estimates, thereby providing net soft symbols or pilot symbol signals as in equations [13] and [14].

$$\tilde{S}_1 = \sum_{j=1}^{L} R_j^2 \alpha_j^{1*} + R_j^{4*} \alpha_j^2 \qquad [13]$$

$$\tilde{S}_2 = \sum_{j=1}^{L} -R_j^{2*} \alpha_j^2 + R_j^4 \alpha_j^{1*} \qquad [14]$$

These soft symbols or estimates provide a path diversity L and a transmit diversity 2. Thus, the total diversity of the STTD system is 2L. This increased diversity is highly advantageous in providing a reduced bit error rate.

Referring now to FIG. 4, there is a simplified diagram of a mobile communication system that may use the phase correction circuit (FIG. 3) with closed-loop power control of the present invention. The mobile communication system includes an antenna 400 for transmitting and receiving external signals. The diplexer 402 controls the transmit and receive function of the antenna. Multiple fingers of rake combiner circuit 404 combine received signals from multiple paths. Symbols from the rake combiner circuit 404, including pilot symbol signals of equations [13] and [14], are applied to a bit error rate (BER) circuit 410 and to a Viterbi decoder 406. Decoded symbols from the Viterbi decoder are applied to a frame error rate (FER) circuit 408. Averaging circuit 412 produces one of a FER and BER. This selected error rate is compared to a corresponding target error rate from reference circuit 414 by comparator circuit 416. The compared result is applied to bias circuit 420 via circuit 418 for generating a signal-to-interference ratio (SIR) reference signal on lead 424.

Pilot symbols from the rake combiner 404 are applied to the SIR measurement circuit 432. These pilot symbols are obtained from a common pilot channel similar to a broadcast channel. The SIR measurement circuit produces a received signal strength indicator (RSSI) estimate from an average of received pilot symbols. The SIR measurement circuit also produces an interference signal strength indicator (ISSI) estimate from an average of interference signals from base stations and other mobile systems over many time slots. The SIR measurement circuit produces an SIR estimate from a ratio of the RSSI signal to the ISSI signal. This SIR estimate is compared with a target SIR by circuit 426. This comparison result is applied to TPC command circuit 430 via circuit 428. The TPC command circuit 430 sets a TPC symbol control signal that is transmitted to a remote base station. This TPC symbol instructs the base station to either increase or decrease transmit power by preferably 1 dB for subsequent transmission.

Referring now to FIG. 5, there is a block diagram showing signal flow in a communication network of the present invention. The communication network includes a network control station 500 connected to each remote base station 502–506. The network control station transmits and receives frames of data in predetermined time slots via the base stations. The network control station performs many other functions including power control and communicating with other communication networks. The network control station initiates SSDT communication with the mobile unit 512 preferably during a soft handoff period such as when the mobile unit moves from one base station to another. This soft handoff period requires the mobile unit 512 to select one of base stations 502–506 with which to communicate. The mobile unit receives an active list from the network control station by which it may identify each base station. The mobile unit also receives information on transmit diversity for each respective base station. For example, the mobile unit determines that base station 502 employs STTD and that base stations 504 and 506 employ no diversity. The mobile unit calculates a SIR from received pilot symbols for each base station and selects one of the base stations as a primary base station. The mobile then transmits 510 the identity of this primary base station back to the network control station via a base station. The network control station then terminates transmission of data symbols to the mobile unit 512 in the next data frame from all except the selected base station. This greatly reduces interference at the mobile unit during soft handoff.

Turning now to FIG. 6, there is a flow diagram showing base station selection of the present invention. The mobile unit receives an active list from the network control station upon SSDT initialization. The mobile unit calculates a SIR for each base station on this active list from the received pilot symbols. The respective SIR signals for each base station are applied via leads 600–604 to selection circuit 620. Selection circuit 620 receives diversity signals corresponding to each base station on leads 606–610. These diversity signals indicate whether the respective base station employs transmit diversity. The selection circuit receives a reference signal $\eta$ on lead 612. This reference signal together with SIR and diversity signals is used to select a primary base station as indicated in TABLE II.

TABLE II

| BTSx | BTSy | Criteria | Selection |
|------|------|----------|-----------|
| ND | ND | SIRx > SIRy | BTSx |
|    |    | SIRy > SIRx | BTSy |
| STTD | STTD | SIRx > SIRy | BTSx |
|      |      | SIRy > SIRx | BTSy |
| STTD | ND | SIRx > SIRy | BTSx |
|      |    | SIRy > SIRx and | |
|      |    | SIRy − SIRx > $\eta$ | BTSy |
|      |    | else | BTSx |
| ND | STTD | SIRy > SIRx | BTSy |
|    |      | SIRx > SIRy and | |
|    |      | SIRx − SIRy > $\eta$ | BTSx |
|    |      | else | BTSy |

The entries of TABLE II show each condition for selecting between base stations BTSx and BTSy. These selection criteria, however, are generally applicable to any number of base stations. Transmit diversity is indicated as STTD but generally applies to any type of diversity. An absence of diversity is indicated as no diversity (ND). For the case where BTSx and BTSy have the same diversity, selection circuit 620 selects the base station with the greatest SIR. Alternatively, when one of the base stations employs transmit diversity, selection circuit 620 selects it as the primary base station if it has a greater SIR than the corresponding base station without diversity. If the base station without diversity has a greater SIR, however, then it is selected as the primary base station only if a difference between the diversity SIR and the non-diversity SIR exceeds the threshold signal $\eta$ on lead 612. This is highly advantageous in providing a selection bias in favor of transmit diversity. This is desirable due to the improved reception of orthogonal symbol transmission from the diversity antenna with STTD.

After the selection circuit 620 identifies a primary base station according to the selection criteria of TABLE II, mobile unit sends the identity of the primary base station back to the network control station 500 via a base station 630. For the case where base station 502 is selected, the network control station then terminates transmission of data symbols to the mobile unit 512 from base stations 504 and 506 for the next frame 640. All data symbols designated for mobile unit 512 are transmitted only by base station 502 in the next data frame. Pilot symbols, however, are transmitted for each base station. Thus, the mobile unit may repeat the base station selection process for subsequent data frames. This greatly reduces interference at the mobile unit during soft handoff. Moreover, the addition of transmit diversity in the selection criteria greatly improves communication within the system as will be discussed in detail.

Figure 9:
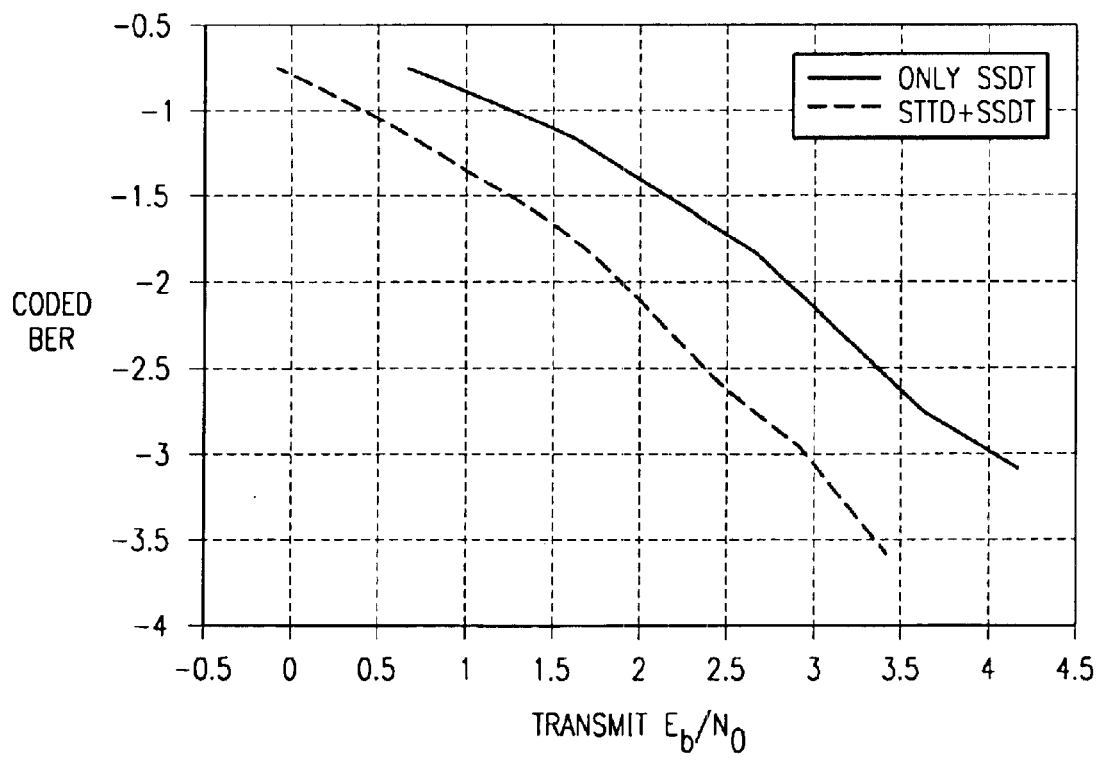
FIG. 9 is a simulation comparing SSDT to STTD and SSDT.

Referring now to FIG. 8 there is a diagram showing simulation parameters for the simulation results of FIG. 9. The simulation is based on a Doppler rate for 3-kmph pedestrian travel with respect to the base station. The non-diversity simulation considers that three base stations transmit pilot symbols to the mobile unit. None of the simulated base stations employ transmit diversity. Thus, selection is based on maximum SIR. The diversity simulation considers that three base stations transmit pilot symbols to the mobile unit. All of the simulated base stations employ STTD. Thus, base station selection is again based on maximum SIR. Referring to FIG. 9, the STTD and SSDT dashed curve shows a 1.1 dB improvement over the SSDT solid curve for a $10^{-3}$ coded bit error rate (BER). Thus, communication is greatly improved by including STTD with SSDT in the communication system. Interference at the mobile unit as well as within the cell is greatly reduced. Moreover, improved soft handoff decisions are quickly made by the mobile unit in the absence of interference from other base stations.

Although the invention has been described in detail with reference to its preferred embodiment, it is to be understood that this description is by way of example only and is not to be construed in a limiting sense. For example, advantages of the present invention may be achieved by a digital signal processing circuit as will be appreciated by those of ordinary skill in the art having access to the instant specification. Furthermore, the advantages of alternative forms of transmit diversity combined with SSDT provide a corresponding improvement in communications.

It is understood that the inventive concept of the present invention may be embodied in a mobile communication system as well as circuits within the mobile communication system. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A method of operating a communication circuit, comprising the steps of:
    receiving a plurality of signals from a plurality of remote transmitters;
    determining which of the plurality of remote transmitters use transmit diversity; calculating a signal strength of each respective signal of the plurality of signals; and
    selecting one of the remote transmitters in response to the steps of determining and calculating.

2. A method as in claim 1, wherein the step of calculating the signal strength comprises calculating a signal-to-interference ratio.

3. A method as in claim 2, wherein the step of selecting comprises selecting a remote transmitter having the greatest signal-to-interference ratio of the plurality of remote transmitters.

4. A method as in claim 1, wherein the plurality of signals from the plurality of remote transmitters comprises pilot symbols.

5. A method as in claim 1, further comprising the step of transmitting an identity of said one of the remote transmitters to a remote receiver.

6. A method as in claim 5, further comprising the step of receiving a plurality of data signals from said one of the remote transmitter in response to the step of transmitting.

7. A method as in claim 1, wherein the transmit diversity is space-time transmit diversity.

8. A method as in claim 1, further comprising the step of comparing a reference value to a difference between signal strengths of the plurality of remote transmitters, wherein the step of selecting further comprises the step of comparing.

9. A method of operating a communication circuit, coming the steps of:
    transmitting a plurality of signals from a respective plurality of transmitters, each transmitter of the respective plurality of transmitters having transmit diversity;
    receiving an identity of a selected transmitter of the plurality of transmitters in response to transmit diversity and signal strength of each respective transmitter; and
    transmitting from the selected transmitter and not transmitting at least one signal from at least another transmitter in response to the step of receiving.

10. A method as in claim 9, wherein the plurality of signals comprises pilot symbols.

11. A method as in claim 9, wherein the transmit diversity is space-time transmit diversity.

12. A method as in claim 9, wherein the signal strength is a signals-to-interference ratio.

13. A method as in claim 9, wherein the step of transmitting from the selected transmitter comprises transmitting data symbols, and wherein not transmitting at least one signal comprises not transmitting at least one data symbol.

14. A method as in claim 9, further comprising transmitting a list of active transmitters from the respective plurality of transmitters.

15. A method of operating a communication circuit, comprising the steps of:
    receiving a plurality of signals from each of a plurality of remote transmitters;
    determining which of the plurality of remote transmitters use transmit diversity;
    calculating a signal strength of each respective signal of the plurality of signals; and
    selecting one of the remote transmitters in response to the steps of determining and calculating.

16. A method as in claim 15, when the step of calculating the signal strength comprises calculating a signal-to-interference ratio.

17. A method as in claim 16, wherein the step of selecting comprises selecting a remote transmitter having the greatest sigal-to-interference ratio of the plurality of remote transmitters.

18. A method as in claim 15, wherein the plurality of signals form the plurality of remote transmitters comprises pilot symbols.

19. A method as in claim 15, further comprising the step of transmitting an identity of said one of the remote transmitters to a remote receiver.

20. A method as in claim 19, further comprising the step of receiving a plurality of data signals from said one of the remote transmitters in response to the step of transmitting.

21. A method as in claim 15, wherein the transmit diversity is space-time transmit diversity.

22. A method as in claim 15, further comprising the step of comparing a refinance value to a difference between signal skis of the plurality of remote transmitters, wherein the step of selecting further comprises the step of comparing.

23. A method of operating a communication circuit, comprising the steps of:
   transmitting a plurality of signals from each of a respective plurality of transmitters, each transmitter of the respective plurality of transmitters having transmit diversity;
   receiving an identity of a selected transmitter of the plurality of transmitters in response to transmit diversity and sigal strength of each respective transmitter; and
   transmitting from the selected transmitter and not transmitting at least one signal from at least another transmitter in response to the step of receiving.

24. A method as in claim 23, wherein the plurality of signals comprises pilot symbols.

25. A method as in claim 23, wherein the transmit diversity is space-time transmit diversity.

26. A method as in claim 23, wherein the signal strength is a signal-to-interference ratio.

27. A method as in claim 23, wherein the step of transmitting firm the selected transmitter comprises transmitting data symbols, and wherein not transmitting at least one sigal comprises not transmitting at least one data symbol.

28. A method as in claim 23, further comprising transmitting a list of active transmitters firm the respective plurality of transmitters.

29. A method of operating a communication circuit, comprising the steps of:
   receiving a plurality of signals from a plurality of remote transmitters, the plurality of signals having a common code;
   determining which of the plurality of remote transmitters use transmit diversity;
   calculating a signal strength of each respective signal of the plurality of signals; and
   selecting one of the remote transmitters in response to the steps of determining and calculating.

30. A method as in claim 29, wherein the step of calculating the signal strength comprises calculating a sigal-to-interference ratio.

31. A method as in claim 30, wherein the step of selecting comprises selecting a remote transmitter having the greatest signal-to-interference ratio of the plurality of remote transmitters.

32. A method as in claim 29, wherein the plurality of signals from the plurality of remote transmitters comprises pilot symbols.

33. A method as in claim 29, further comprising the step of transmitting an identity of said one of the remote transmitters to a remote receiver.

34. A method as in claim 33, further comprising the step of receiving a plurality of data signals from said one of the remote transmitters in response to the step of transmitting.

35. A method as in claim 29, wherein the transmit diversity is space-time transmit diversity.

36. A method as in claim 29, further comprising the step of comparing a reference value to a difference between signal strengths of the plurality of remote transmitters, wherein the step of selecting further comprises the step of comparing.

37. A method of operating a communication circuit, comprising the steps of:
   transmitting a plurality of signals from a respective plurality of transmitters, the plurality of signals having a common code and each transmitter of the respective plurality of transmitters having transmit diversity;
   receiving an identity of a selected transmitter of the plurality of transmitters in response to transmit diversity and signal strength of each respective transmitter; and
   transmitting from the selected transmitter and not transmitting at least one signal from at least another transmitter in response to the stop of receiving.

38. A method as in claim 37, wherein the plurality of signals comprises pilot symbols.

39. A method as in claim 37, wherein the transmit diversity is space-time transmit diversity.

40. A method as in claim 37, wherein the signal strength is a signal-to-interference ratio.

41. A method as in claim 37, wherein the step of transmitting from the selected transmitter comprises transmitting data symbols, and wherein not transmitting at least one signal comprises not transmitting at least one data symbol.

42. A method as in claim 37, further comprising transmitting a list of active transmitter from the respective plurality of transmitters.

43. A method of operating a communication circuit, comprising the steps of:
   receiving a plurality of signals from a plurality of remote base stations;
   determining which of the plurality of remote base stations use transmit diversity;
   calculating a signal strength of each respective signal of the plurality of signals; and
   selecting one of the remote base stations in response to the steps of determining and calculating.

44. A method as in claim 43, wherein the step of calculating the signal strength comprises calculating a signal-to-interference ratio.

45. A method as in claim 44, wherein the step of selecting comprises selecting a remote base station having the greatest signal-to-interference ratio of the plurality of remote base stations.

46. A method as in claim 43, wherein the plurality of sirs from the plurality of remote base stations comprises pilot symbols.

47. A method as in claim 43, further comprising the step of transmitting an identity of said one of the remote base stations to a remote receiver.

48. A method as in claim 47, further comprising the step of receiving a plurality of data signals from said one of the remote base stations in response to the step of transmitting.

49. A method as in claim 43, wherein the transmit diversity is space-time transmit diversity.

50. A method as in claim 43, further comprising the step of comparing a reference value to a difference between signal strengths of the plurality of remote base stations, wherein the step of selecting further comprises the step of comparing.

51. A method of operating a communication circuit, comprising the steps of:
   transmitting a plurality of signals from a respective plurality of base stations;
   receiving an identity of a selected base station of the plurality of base stations in response to transmit diversity and signal strength of each respective base station; and
   transmitting from the selected base station and not transmitting at least one signal from at least another base station in response to the step of receiving.

52. A method as in claim 51, wherein the plurality of signals comprises pilot symbols.

53. A method as in claim 51, wherein the transmit diversity is space-time transmit diversity.

54. A method as in claim 51, wherein thesis strength is a signal-to-interference ratio.

55. A method as in claim 51, wherein the step of transmitting from the selected base station comprises transmitting data symbols, and wherein not transmitting at least one signal comprises not transmitting at least one data symbol.

56. A method as in claim 55, further comprising transmitting a list of active base stations from the respective plurality of base stations.

57. A method of operating a communication circuit, comprising the steps of:
   receiving a plurality of signals from a plurality of remote transmitters, the plurality of signals having common data;
   determining which of the plurality of remote transmitters use transmit diversity;
   calculating a signal strength of each respective signal of the plurality of signals; and
   selecting one of the remote transmitters in response to the steps of determining and calculating.

58. A method as in claim 57, wherein the step of calculating the signal strength comprises calculating a signal-to-interference ratio.

59. A method as in claim 58, wherein the step of selecting comprises selecting a remote transmitter having the greatest signal-to-interference ratio of the plurality of remote transmitters.

60. A method as in claim 57, wherein the plurality of signals from the plurality of remote transmitters comprise pilot symbols.

61. A method as in claim 57, further comprising the step of transmitting an identity of said one of the remote transmitters to a remote receiver.

62. A method as in claim 61, further comprising the step of receiving a plurality of data signals from said one of the remote transmitters in response to the step of transmitting.

63. A method as in claim 57, wherein the transmit diversity is space-time transmit diversity.

64. A method as in claim 57, further comprising the step of comparing a reference value to a difference between signal strengths of the plurality of remote transmitters, wherein the step of selecting further comprises the step of comparing.

65. A method of operating a communication circuit, comprising the steps of:
   transmitting a plurality of signals from a respective plurality of transmitters, the plurality of signals having common data and each transmitter of the respective plurality of transmitters having transmit diversity;
   receiving an identity of a selected transmitter of the plurality of transmitters in response to transmit diversity and signal strength of each respective transmitter; and
   transmitting from the selected transmitter and not transmitting at least one signal from at least another transmitter in response to the step of receiving.

66. A method as in claim 65, wherein the plurality of signals comprises pilot symbols.

67. A method as in claim 65, wherein the transmit diversity is space-time transmit diversity.

68. A method as in claim 65, wherein the signal strength is a signal-to-interference ratio.

69. A method as in claim 65, wherein the step of transmitting from the selected transmitter comprises transmitting data symbols, and wherein not transmitting at least one signal comprises not transmitting at least one data symbol.

70. A method as in claim 65, further comprising transmitting a list of active transmitters from the respective plurality of transmitters.

* * * * *